(12) United States Patent
Otani

(10) Patent No.: US 9,947,473 B2
(45) Date of Patent: Apr. 17, 2018

(54) MULTILAYER CERAMIC CAPACITOR

(71) Applicant: Murata Manufacturing Co., Ltd., Nagaokakyo-shi, Kyoto-fu (JP)

(72) Inventor: Shinji Otani, Nagaokakyo (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 17 days.

(21) Appl. No.: 15/173,811

(22) Filed: Jun. 6, 2016

(65) Prior Publication Data

US 2016/0379758 A1    Dec. 29, 2016

(30) Foreign Application Priority Data

Jun. 24, 2015    (JP) .................................. 2015-126308

(51) Int. Cl.
| | |
|---|---|
| *H01G 4/232* | (2006.01) |
| *H01G 4/30* | (2006.01) |
| *H01G 4/005* | (2006.01) |
| *H01G 4/12* | (2006.01) |

(52) U.S. Cl.
CPC .............. *H01G 4/30* (2013.01); *H01G 4/005* (2013.01); *H01G 4/232* (2013.01); *H01G 4/2325* (2013.01); *H01G 4/12* (2013.01)

(58) Field of Classification Search
CPC ....... H01G 4/2325; H01G 4/232; H01G 4/428
See application file for complete search history.

(56) References Cited

U.S. PATENT DOCUMENTS

| | | | |
|---|---|---|---|
| 2007/0242416 A1 | 10/2007 | Saito et al. | |
| 2011/0007449 A1* | 1/2011 | Seo .................. | H01G 4/232 361/321.2 |
| 2012/0007709 A1* | 1/2012 | Taniguchi .............. | H01G 4/005 336/200 |
| 2014/0160627 A1 | 6/2014 | Kobayashi et al. | |
| 2015/0170786 A1* | 6/2015 | Hong ....................... | H01B 1/02 174/260 |

FOREIGN PATENT DOCUMENTS

| | | | |
|---|---|---|---|
| JP | 08037127 A | * | 2/1996 |
| JP | 2002-252124 A | | 9/2002 |
| JP | 2007-281400 A | | 10/2007 |
| JP | 2014-116340 A | | 6/2014 |

OTHER PUBLICATIONS

Official Communication issued in Korean Patent Application No. 10-2016-0070676, dated Apr. 21, 2017.

* cited by examiner

*Primary Examiner* — Eric Thomas
(74) *Attorney, Agent, or Firm* — Keating & Bennett, LLP

(57) ABSTRACT

A multilayer ceramic capacitor includes a multilayer body and a pair of outer electrodes on end surfaces of the multilayer body. The multilayer body includes a stack of ceramic layers and inner electrodes electrically connected to the outer electrodes. Each of the pair of outer electrodes includes an underlying electrode layer on a surface of the multilayer body, an intermediate metal layer on a surface of the underlying electrode layer, and a conductive resin layer on a surface of the intermediate metal layer. The underlying electrode layer contains Ni, and the intermediate metal layer contains a Cu—Ni—Sn alloy.

20 Claims, 3 Drawing Sheets

MULTILAYER CERAMIC CAPACITOR

BACKGROUND OF THE INVENTION

1. Field of the Invention

The present invention relates to multilayer ceramic capacitors, in particular a multilayer ceramic capacitor that includes multilayer outer electrodes.

2. Description of the Related Art

Multilayer ceramic chip capacitors have been widely used in recent years. A multilayer ceramic capacitor includes a multilayer body and outer electrodes on the end surfaces of the multilayer body. The multilayer body is composed of alternately stacked ceramic layers and substantially flat-plate inner electrodes, and the outer electrodes are electrically coupled to the inner electrodes. In some multilayer ceramic capacitors, the outer electrodes have a multilayer structure for purposes such as improved mechanical strength. Japanese Unexamined Patent Application Publication No. 2014-116340 discloses a multilayer ceramic capacitor of this type.

This multilayer ceramic capacitor has five-layer outer electrodes. Each outer electrode has an underlying electrode layer in close contact with a multilayer body, a first intermediate metal layer in close contact with the surface of the underlying metal layer, an intermediate conductive resin layer in close contact with the surface of the first intermediate metal layer, a second intermediate metal layer in close contact with the surface of the intermediate conductive resin layer, and a surface metal layer in close contact with the surface of the second intermediate metal layer.

The underlying metal layer is made of a mixture of nickel, copper, palladium, platinum, silver, gold, or an alloy thereof and the base component of dielectric layers and a margin section or a mixture of such a metal or alloy and a glass component such as silica. The first and second intermediate metal layers are made of nickel, copper, palladium, platinum, silver, gold, or an alloy thereof. The surface metal layer is made of tin, palladium, gold, zinc, or an alloy thereof. The intermediate conductive resin layer is made of an epoxy resin that contains conductive filler. The conductive filler is a metal filler made of silver, copper, nickel, or an alloy thereof or a carbon filler.

The multilayer ceramic capacitor disclosed in Japanese Unexamined Patent Application Publication No. 2014-116340 has an intermediate conductive resin layer in the outer electrodes for improved mechanical strength. Formed to cover the surface of the first intermediate metal layer, the intermediate conductive resin layer does not firmly adhere to the first intermediate metal layer. Water and other contaminants easily penetrate into the space between the intermediate conductive resin layer and the first intermediate metal layer, and this affects the waterproof reliability and electrical characteristics of the multilayer ceramic capacitor. Furthermore, the electrical connections between the outer electrodes and the inner electrodes are not sufficiently reliable.

SUMMARY OF THE INVENTION

Preferred embodiments of the present invention provide a multilayer ceramic capacitor that offers improved mechanical strength through the use of outer electrodes and possesses good waterproof reliability and electrical characteristics because of firm adhesion between layers in the outer electrodes.

According to a preferred embodiment of the present invention, a multilayer ceramic capacitor includes a multilayer body and a pair of outer electrodes on a surface of the multilayer body. The multilayer body includes a stack of a plurality of ceramic layers and a plurality of inner electrodes, and the outer electrodes are electrically coupled to the inner electrodes. Each of the pair of outer electrodes includes an underlying electrode layer on a surface of the multilayer body, an intermediate metal layer on a surface of the underlying electrode layer, and a conductive resin layer on a surface of the intermediate metal layer. The underlying electrode layer contains Ni, and the intermediate metal layer contains a Cu—Ni—Sn alloy.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
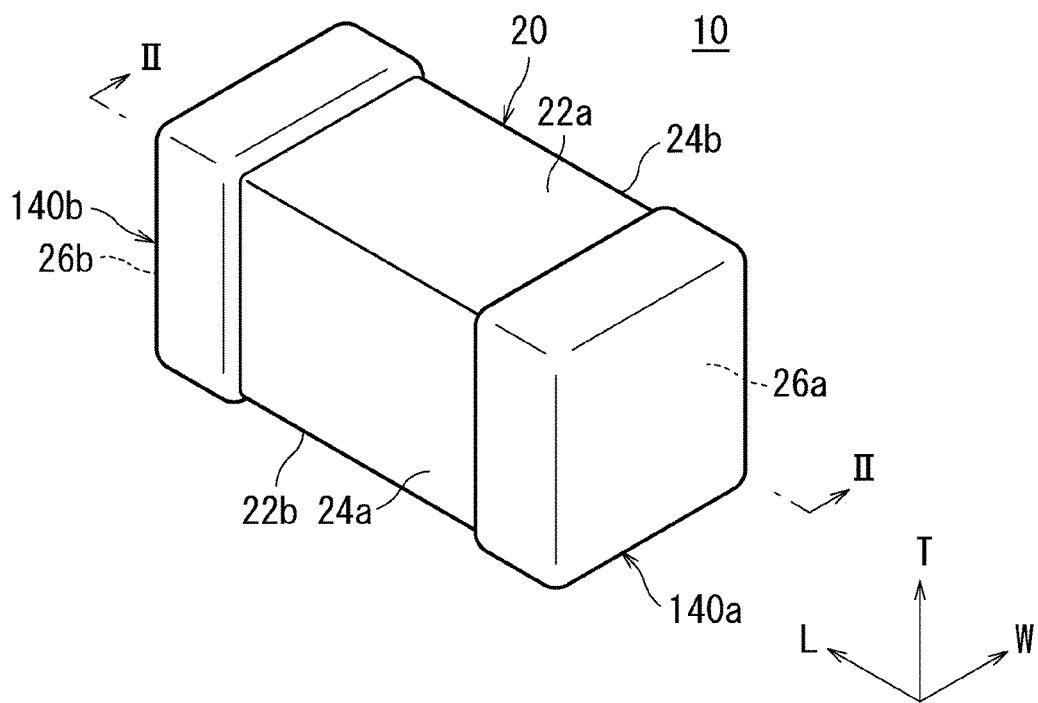
FIG. 1 is an external perspective view of a multilayer ceramic capacitor according to a preferred embodiment of the present invention.
Figure 2:
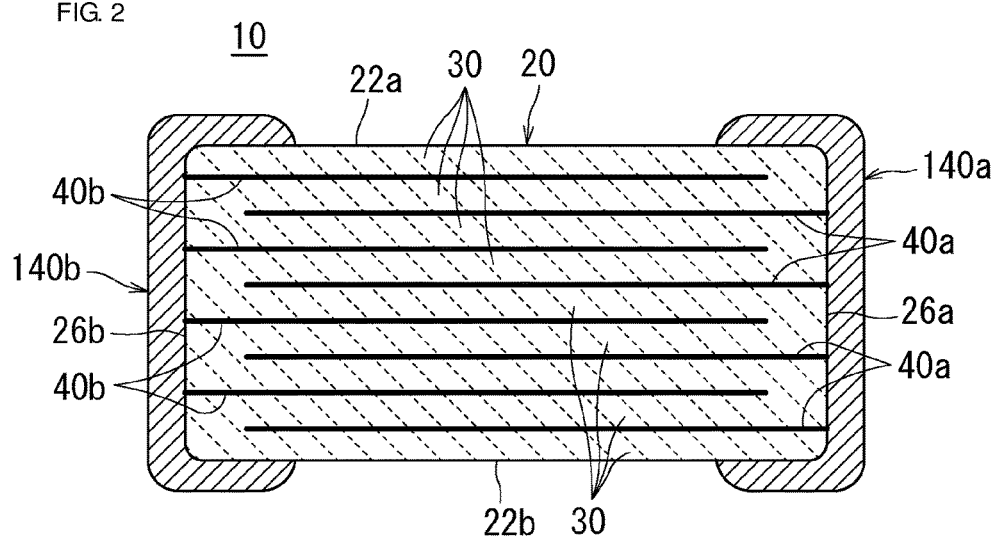
FIG. 2 is a cross-section of the multilayer ceramic capacitor according to a preferred embodiment of the present invention taken along line II-II of FIG. 1.
Figure 3:
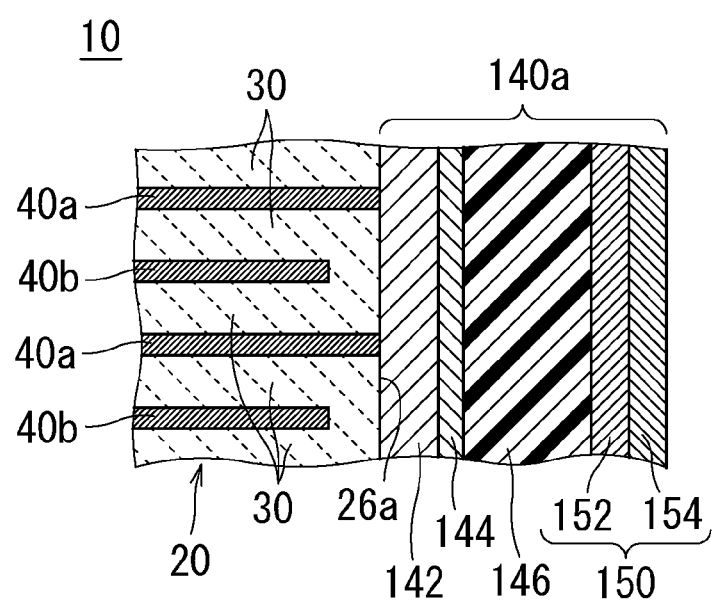
FIG. 3 is an enlarged view of a first outer electrode and its vicinity in the cross-section of the multilayer ceramic capacitor according to a preferred embodiment of the present invention in FIG. 2.

The following describes a multilayer ceramic capacitor according to a preferred embodiment of the present invention with reference to drawings. FIG. 1 is an external perspective view of the multilayer ceramic capacitor according to a preferred embodiment of the present invention. FIG. 2 is a cross-section of the multilayer ceramic capacitor according to a preferred embodiment of the present invention taken along line II-II of FIG. 1. FIG. 3 is an enlarged view of a first outer electrode and its vicinity in the cross-section of the multilayer ceramic capacitor according to a preferred embodiment of the present invention in FIG. 2.

A multilayer ceramic capacitor 10 according to this preferred embodiment includes a multilayer body 20 and first and second outer electrodes 140a and 140b (a pair of outer electrodes).

The multilayer body 20 includes a stack of multiple ceramic layers 30 and multiple first and second inner electrodes 40a and 40b.

The multilayer body 20 preferably has a substantially cuboid shape, for example, that includes opposite first and second main surfaces 22a and 22b, opposite first and second side surfaces 24a and 24b, and opposite first and second end surfaces 26a and 26b. The direction of a line that connects the first and second end surfaces 26a and 26b is the length (L), that of a line that connects the first and second side surfaces 24a and 24b is the width (W), and that of a line that connects the first and second main surfaces 22a and 22b is the height (T).

The multilayer body 20 preferably has rounded corners and edges. The multilayer body 20 may have any substantially cuboid shape that includes the first and second main surfaces 22a and 22b, the first and second side surfaces 24a and 24b, and the first and second end surfaces 26a and 26b. For example, the multilayer body 20 may have irregularities on some or all of the first and second main surfaces 22a and 22b, the first and second side surfaces 24a and 24b, and the first and second end surfaces 26a and 26b.

The ceramic layers 30 are stacked in direction T between the first and second inner electrodes 40a and 40b. The thickness of the ceramic layers 30 is preferably about 0.5 µm or more and about 10 µm or less, for example.

The ceramic material for the ceramic layers 30 can be, for example, a dielectric ceramic the main component of which is $BaTiO_3$, $CaTiO_3$, $SrTiO_3$, $CaZrO_3$, or similar. Besides the main component, the dielectric ceramic may contain minor components such as Mn compounds, Fe compounds, Cr compounds, Co compounds, and Ni compounds.

The first inner electrodes 40a extend in the interfaces between the ceramic layers 30 like flat plates and are exposed on the first end surface 26a of the multilayer body 20. The second inner electrodes 40b extend in the interfaces between the ceramic layers 30 like flat plates and are exposed on the second end surface 26b of the multilayer body 20. The first and second inner electrodes 40a and 40b face each other with the ceramic layers 30 interposed therebetween. The first and second inner electrodes 40a and 40b therefore include a facing portion where they face each other with the ceramic layers 30 therebetween and an extended portion where they reach the first and second end surfaces 26a and 26b. This structure in which the first and second inner electrodes 40a and 40b face each other with the ceramic layers 30 therebetween produces an electrostatic capacitance. The thickness of the first and second inner electrodes 40a and 40b is preferably about 0.2 µm or more and about 2.0 µm or less, for example.

The first and second inner electrodes 40a and 40b are preferably made of an appropriate conductive material. Examples include metals such as Ni, Cu, Ag, Pd, and Au, Ag—Pd alloys, and alloys that contain at least one such metal.

The first outer electrode 140a covers the first end surface 26a of the multilayer body 20, a portion of each of the first and second main surfaces 22a and 22b, and a portion of each of the first and second side surfaces 24a and 24b and is electrically coupled to the first inner electrodes 40a at the first end surface 26a. The second outer electrode 140b covers the second end surface 26b of the multilayer body 20, a portion of each of the first and second main surfaces 22a and 22b, and a portion of each of the first and second side surfaces 24a and 24b and is electrically coupled to the second inner electrodes 40b at the second end surface 26b.

The first and second outer electrodes 140a and 140b have a multilayer structure that includes an underlying electrode layer 142, an intermediate metal layer 144, a conductive resin layer 146, and a plating layer 150. The plating layer 150 is optional in the first and second outer electrodes 140a and 140b.

The underlying electrode layer 142 preferably covers the first or second end surface 26a or 26b of the multilayer body 20, a portion of each of the first and second main surfaces 22a and 22b, and a portion of each of the first and second side surfaces 24a and 24b. The underlying electrode layer 142 may be confined to the first or second end surface 26a or 26b of the multilayer body 20. The thickness of the thickest a portion of the underlying electrode layer 142 is preferably, for example, about 10 µm or more and about 50 µm or less.

The formation of the underlying electrode layer 142 is preferably performed by, for example, the application and firing of a conductive paste that contains a conductive metal and glass. Examples of conductive metals that can be used include Ni and Ni alloys, and examples of glass materials that can be used include those that contain elements such as B, Si, Ba, Mg, Al, and Li. The underlying electrode layer 142 may be formed by co-firing, or at the same time as the firing for the formation of the first and second inner electrodes 40a and 40b, or post-firing, i.e., by applying and firing a conductive paste.

The intermediate metal layer 144 is located on the surface of the underlying electrode layer 142 and covers the underlying electrode layer 142. More specifically, the intermediate metal layer 144 preferably covers the surface of the underlying electrode layer 142 located on the first or second end surface 26a or 26b of the multilayer body 20 and the surface of the underlying electrode layer 142 located on a portion of each of the first and second main surfaces 22a and 22b and a portion of each of the first and second side surfaces 24a and 24b. The intermediate metal layer 144 may be confined to the surface of the underlying electrode layer 142 located on the first or second end surface 26a or 26b of the multilayer body 20. The thickness of the intermediate metal layer 144 is preferably about 0.3 µm or more and about 15.8 µm or less, for example.

The intermediate metal layer 144 contains a Cu—Ni—Sn alloy. Preferably, the Cu—Ni—Sn alloy in the intermediate metal layer 144 is $(Cu, Ni)_6Sn_5$. More preferably, the intermediate metal layer 144 contains a Cu—Ni—Sn alloy in which the amount of dissolved Ni is about 5 atom % or more and about 42 atom % or less, for example.

The conductive resin layer 146 is on the surface of the intermediate metal layer 144 and covers the intermediate metal layer 144. More specifically, the conductive resin layer 146 preferably covers the surface of the intermediate metal layer 144 located on the first or second end surface 26a or 26b of the multilayer body 20 and the surface of the intermediate metal layer 144 located on a portion of each of the first and second main surfaces 22a and 22b and a portion of each of the first and second side surfaces 24a and 24b. The conductive resin layer 146 may be confined to the surface of the intermediate metal layer 144 located on the first or second end surface 26a or 26b of the multilayer body 20. The thickness of the conductive resin layer 146 is preferably, for example, about 10 µm or more and about 150 µm or less.

The conductive resin layer 146 is a layer in which conductive fillers are dispersed in a resin, for example.

The particles of the conductive filler can be in the shape of spheres, ellipsoids, and so forth. When the particles of the conductive filler have various shapes including spheres and ellipsoids, it is preferred to use the filler as a mixture of the spherical and ellipsoidal particles. The particles of the conductive filler can be in any shape. The average particle diameter of the conductive filler is not limited and can be, for example, about 0.3 µm or more and about 10 µm or less.

The conductive filler may be Cu, Sn, or an alloy that contains these metals. The use of Cu, Sn, or an alloy that contains these metals allows for the formation of the intermediate metal layer 144, a layer that contains a Cu—Ni—Sn alloy.

The primary role of the conductive filler is to ensure the conductivity of the conductive resin layer 146. More specifically, chains of particles of the conductive filler define pathways in the conductive resin layer 146 to enable electricity to pass through.

The resin as a component of the conductive resin layer 146 can be, for example, a known thermosetting resin such as epoxy resin, phenolic resin, urethane resin, silicone resin, and polyimide resin. It is particularly preferred that the resin in the conductive resin layer 146 be epoxy resin. With its excellent characteristics including heat resistance, humidity resistance, and adhesiveness, epoxy resin is one of the most suitable resins. The conductive resin layer 146 preferably contains a curing agent in combination with a thermosetting resin. When the thermosetting resin is epoxy resin, the curing agent can be a known compound such as a phenolic, amine, acid anhydride, or imidazole compound.

The conductive resin layer 146, which contains resin, is flexible as compared with, for example, a plating coating or a conductive layer obtained by firing a conductive paste. The conductive resin layer 146 therefore serves as a buffer against physical or thermal-cycling-related impact on the multilayer ceramic capacitor 10. This prevents defects in the multilayer ceramic capacitor 10 such as cracks. The multilayer ceramic capacitor 10 therefore offers improved mechanical strength, including resistance to substrate bending and drop impact resistance, because of the presence of the conductive resin layer 146.

The plating layer 150 is on the surface of the conductive resin layer 146 and covers the conductive resin layer 146. More specifically, the plating layer 150 preferably covers the surface of the conductive resin layer 146 located on the first or second end surface 26a or 26b of the multilayer body 20 and the surface of the conductive resin layer 146 located on a portion of each of the first and second main surfaces 22a and 22b and a portion of each of the first and second side surfaces 24a and 24b. The plating layer 150 may be confined to the surface of the conductive resin layer 146 located on the first or second end surface 26a or 26b of the multilayer body 20.

The plating layer 150 contains at least one selected from metals including Cu, Ni, Sn, Ag, Pd, Ag—Pd alloys, and Au.

The plating layer 150 preferably has a two-layer structure that includes first and second plating layers 152 and 154. The plating layer 150 may be in a single-layer structure in which the first plating layer 152 is the only component or may alternatively be in a multilayer structure that includes three or more layers. The thickness per layer of the plating layer 150 is preferably about 1 μm or more and about 15 μm or less, for example.

The first plating layer 152 is on the surface of the conductive resin layer 146 and covers the conductive resin layer 146. The first plating layer 152 is preferably Ni plating. Ni plating provides the multilayer ceramic capacitor 10 with an improved barrier against solder. The first plating layer 152 may have a multilayer structure.

The second plating layer 154 is on the surface of the first plating layer 152 and covers the first plating layer 152. The second plating layer 154 is preferably Sn plating. Sn plating provides the multilayer ceramic capacitor 10 with improved wettability. Improved wettability makes the multilayer ceramic capacitor 10 easier to mount.

In a preferred embodiment of the present invention, a multilayer ceramic capacitor 10 includes multilayer outer electrodes 140a and 140b in which an underlying electrode layer 142 and a conductive resin layer 146 are joined together by an intermediate metal layer 144 that contains a Cu—Ni—Sn alloy. The resulting firm adhesion between layers in the outer electrodes 140a and 140b makes the capacitor more reliable in terms of waterproofness and electrical continuity. Furthermore, the presence of the conductive resin layer 146 in the outer electrodes 140a and 140b leads to improved mechanical strength including resistance to substrate bending and drop impact resistance. The multilayer ceramic capacitor 10 therefore offers improved mechanical strength through the use of the outer electrodes 140a and 140b and possesses good waterproof reliability and electrical characteristics because of firm adhesion between layers in the outer electrodes 140a and 140b.

In the multilayer ceramic capacitor 10 according to a preferred embodiment of the present invention, the Cu—Ni—Sn alloy in the intermediate metal layer 144 may be $(Cu, Ni)_6Sn_5$. This would make the capacitor even more reliable in terms of waterproofness and electrical continuity.

In the multilayer ceramic capacitor 10 according to a preferred embodiment of the present invention, the intermediate metal layer 144 may contain a Cu—Ni—Sn alloy in which the amount of dissolved Ni is about 5 atom % or more and about 42 atom % or less, for example. This would make the capacitor even more reliable in terms of waterproofness and electrical continuity.

In the multilayer ceramic capacitor 10 according to a preferred embodiment of the present invention, the intermediate metal layer 144 may have a thickness of about 0.3 μm or more and about 15.8 μm or less, for example. This would make the capacitor even more reliable in terms of waterproofness and electrical continuity.

In the multilayer ceramic capacitor 10 according to a preferred embodiment of the present invention, the conductive resin layer 146 may contain a thermosetting resin and at least one metal, and the at least one metal may include Cu, Sn, or an alloy thereof. This would allow for the formation of the intermediate metal layer 144, a layer that contains a Cu—Ni—Sn alloy.

The following describes a non-limiting example of a method for the manufacture of multilayer ceramic capacitors.

First, a ceramic paste that contains a ceramic powder is applied using, for example, screen printing to give sheets of ceramic paste. These sheets are dried to give ceramic green sheets.

A conductive paste for the formation of inner electrodes is then applied to the surface of some of the ceramic green sheets using, for example, screen printing to draw a predetermined pattern. This produces ceramic green sheets with a conductive pattern for the formation of inner electrodes thereon. Ceramic green sheets with no conductive pattern for the formation of inner electrodes thereon are also prepared. The ceramic paste and/or the conductive paste for the formation of inner electrodes may contain, for example, a known binder and/or a known solvent.

Then a predetermined number of ceramic green sheets with no conductive pattern for the formation of inner electrodes thereon are stacked. Ceramic green sheets with a conductive pattern for the formation of inner electrodes thereon are stacked on the surface of the resulting structure. A predetermined number of ceramic green sheets with no conductive pattern for the formation of inner electrodes thereon are then stacked on the surface of the resulting structure. A mother multilayer body is produced in this way.

The mother multilayer body may optionally be pressed in the direction of stacking. An example of a possible way to press the mother multilayer body is isostatic pressing.

The mother multilayer body is cut into a predetermined size and shape to give raw multilayer bodies. The resulting raw multilayer bodies may be subjected to barreling or any other polishing process to make their corners and edges rounded.

Lastly, the raw multilayer bodies are fired. This yields multilayer bodies each containing first and second inner electrodes with an end portion of the first inner electrodes extended to a first end surface of the multilayer body and an end portion of the second inner electrodes to a second end surface. The temperature at which the raw multilayer bodies are fired can be selected according to the ceramic and conductive materials used. The raw multilayer bodies can be fired at a temperature of, for example, about 900° C. or more and about 1300° C. or less.

The two end surfaces of the resulting multilayer bodies are coated with a conductive paste, and the resulting coating is fired to provide an underlying electrode layer of the outer electrodes. The firing temperature is preferably about 700° C. or more and about 900° C. or less, for example.

A conductive resin paste that contains resin and conductive filler is then applied to cover the underlying electrode layer, and the resulting coating is heated at a temperature of about 150° C. or more and about 300° C. or less, for example, to thermally cure the resin. This yields a conductive resin layer that covers the underlying electrode layer. At the same time, an intermediate metal layer is formed between the underlying electrode layer and the conductive resin layer. The amount of dissolved Ni (atom %) in the (Cu, Ni)$_6$Sn$_5$ contained in the intermediate metal layer can be controlled by changing the maximum heating temperature. More specifically, the amount of dissolved Ni (atom %) in the (Cu, Ni)$_6$Sn$_5$ contained in the intermediate metal layer decreases with reduced maximum heating temperature and increases with elevated maximum heating temperature. Likewise, the thickness of the intermediate metal layer can be controlled by changing the duration of heating. More specifically, the thickness of the intermediate metal layer decreases with shortened duration of heating and increases with extended duration of heating.

The heating atmosphere is preferably a N$_2$ atmosphere. It is preferred to keep the oxygen level at about 100 ppm or less, for example. This prevents splashing of the resin and oxidation of the metallic components.

The surface of the conductive resin layer may optionally be plated with Ni (a first plating layer). The Ni plating can be formed using electroplating.

The surface of the Ni plating (first plating layer) may optionally be plated with Sn (a second plating layer).

In this way, multilayer ceramic capacitors according to a preferred embodiment of the present invention are manufactured.

The following describes an experiment the inventors performed to confirm the advantages of various preferred embodiments of the present invention. The inventors prepared samples of Examples 1 to 14 and Comparative Examples 1 to 3 using the method for the manufacture of multilayer ceramic capacitors described above and evaluated the waterproof reliability and electrical characteristics of each example or comparative example. For each of Examples 1 to 14 and Comparative Examples 1 to 3, the number of samples tested was 100.

The sample multilayer ceramic capacitors of Examples 1 to 14 and Comparative Examples 1 to 3 had the following parameters.

Size (design values) L×W×T: About 1.0 mm×About 0.5 mm×About 0.5 mm

Ceramic material: BaTi$_2$O$_3$

Electrostatic capacitance: About 2.2 μF

Rated voltage: About 6.3 V

Outer electrode structure: A multilayer structure composed of an underlying electrode layer, an intermediate metal layer, a conductive resin layer, and a plating layer Underlying electrode layer: A fired electrode that contained a conductive metal (Ni) and glass Plating layer structure: A two-layer structure composed of Ni plating (a first plating layer) and Sn plating (a second plating layer)

EXAMPLES

In Example 1, the Cu—Ni—Sn alloy as a material for the intermediate metal layer was (Cu, Ni)$_6$Sn$_5$. The conductive resin layer contained Cu and Sn as conductive fillers. The resin as a component of the conductive resin layer was resole phenolic resin. The amount of the conductive fillers in the dried coating (the proportion of the conductive fillers to the resin), Cu+Sn fillers, was about 60 vol %. The ratio Cu:Sn was about 58:42 wt %.

In Example 2, the Cu—Ni—Sn alloy as a material for the intermediate metal layer was not (Cu, Ni)$_6$Sn$_5$. The conductive resin layer contained Cu and Sn as conductive fillers. The resin as a component of the conductive resin layer was resole phenolic resin. The amount of the conductive fillers in the dried coating (the proportion of the conductive fillers to the resin), Cu+Sn fillers, was about 60 vol %. The ratio Cu:Sn was about 70:30 wt %.

In Examples 3 to 8, the samples were prepared in the same way as in Example 1 but with different (maximum) heating temperatures so that they would vary in the amount of dissolved Ni (atom %) in (Cu, Ni)$_6$Sn$_5$. The duration of heating was constant (about 18 min). More specifically, the heating temperatures were as follows.

In Example 3, the (maximum) heating temperature was about 375° C. The amount of dissolved Ni was about 2 atom %.

In Example 4, the (maximum) heating temperature was about 400° C. The amount of dissolved Ni was about 5 atom %.

In Example 5, the (maximum) heating temperature was about 425° C. The amount of dissolved Ni was about 10 atom %.

In Example 6, the (maximum) heating temperature was about 450° C. The amount of dissolved Ni was about 20 atom %.

In Example 7, the (maximum) heating temperature was about 475° C. The amount of dissolved Ni was about 42 atom %.

In Example 8, the (maximum) heating temperature was about 500° C. The amount of dissolved Ni was about 65 atom %.

In Examples 9 to 14, the samples were prepared in the same way as in Example 1 but with different durations of heating so that they would vary in the effective thickness of (Cu, Ni)$_6$Sn$_5$. The amount of dissolved Ni (atom %) in (Cu, Ni)$_6$Sn$_5$ was about 5 atom % or more and about 42 atom % or less across Examples 9 to 14. The (maximum) heating temperature was constant (about 450° C.). More specifically, the durations of heating were as follows.

In Example 9, the amount of dissolved Ni was about 11 atom %, and the duration of heating was about 2 min. The effective thickness of (Cu, Ni)$_6$Sn$_5$ was about 0.1 μm.

In Example 10, the amount of dissolved Ni was about 18 atom %, and the duration of heating was about 5 min. The effective thickness of (Cu, Ni)$_6$Sn$_5$ was about 0.3 μm.

In Example 11, the amount of dissolved Ni was about 16 atom %, and the duration of heating was about 10 min. The effective thickness of (Cu, Ni)$_6$Sn$_5$ was about 3.2 μm.

In Example 12, the amount of dissolved Ni was about 26 atom %, and the duration of heating was about 20 min. The effective thickness of (Cu, Ni)$_6$Sn$_5$ was about 8.9 μm.

In Example 13, the amount of dissolved Ni was about 38 atom %, and the duration of heating was about 30 min. The effective thickness of (Cu, Ni)$_6$Sn$_5$ was about 15.8 μm.

In Example 14, the amount of dissolved Ni was about 37 atom %, and the duration of heating was about 40 min. The effective thickness of (Cu, Ni)$_6$Sn$_5$ was about 24 μm.

Comparative Examples

In Comparative Example 1, the intermediate metal layer contained no Cu—Ni—Sn alloy. The conductive resin layer contained Ag as a conductive filler. The resin as a component of the conductive resin layer was epoxy resin. The amount of the conductive filler in the dried coating (the proportion of the conductive filler to the resin), Ag filler, was about 60 vol %.

In Comparative Example 2, the intermediate metal layer contained no Cu—Ni—Sn alloy. The conductive resin layer contained Cu as a conductive filler. The resin as a component of the conductive resin layer was resole phenolic resin. The amount of the conductive filler in the dried coating (the proportion of the conductive filler to the resin), Cu filler, was about 60 vol %.

In Comparative Example 3, the intermediate metal layer contained no Cu—Ni—Sn alloy. The conductive resin layer contained Ag and Sn as conductive fillers. The resin as a component of the conductive resin layer was epoxy resin. The amount of the conductive fillers in the dried coating (the proportion of the conductive fillers to the resin), Ag+Sn fillers, was about 60 vol %. The ratio Ag:Sn was about 68:32 wt %.

Evaluation

Examples 1 to 14 and Comparative Examples 1 to 3 were evaluated for waterproof reliability and electrical characteristics.

The waterproof reliability was evaluated as follows. The samples were each mounted on a glass epoxy substrate by reflow soldering using Sn-3.0Ag-0.5Cu, a commonly used lead-free solder. The samples were then subjected to an accelerated aging test under humid conditions in which a rated voltage of about 6.3 V was applied to each sample for about 72 hours in a high-temperature and high-humidity chamber conditioned to about 125° C., a relative humidity of about 95% RH, and about 1.2 atm, followed by the measurement of log IR. Each example or comparative example was rated x if the log IR was less than 6 in two or more samples, Δ if the log IR was less than 6 in only one sample, ○ if all samples maintained a log IR of 6 or more, and ⊚ if all samples maintained a log IR of 6 or more for about 144 h (double the specified time). The number of samples tested was 70 in this accelerated humidity aging test.

The electrical characteristics were evaluated as follows. The samples were each subjected to an electrical characteristics test in which the sample was analyzed using an impedance analyzer (Agilent Technologies 4294A) by scanning a frequency range of about 1 kHz to about 10 MHz at a voltage of about 1 Vrms, followed by the measurement of ESR at 1 MHz. The test fixture was Agilent Technologies 16044A. The example or comparative example was rated x if the mean of average ESRs was more than 50 mΩ, ○ if the mean of average ESRs was 50 mΩ or less, and ⊚ if the mean of average ESRs was 10 mΩ or less. The number of samples tested was 30 in this electrical characteristics test.

Analysis

For each of Examples and Comparative Examples, the sample multilayer ceramic capacitors were analyzed for the presence of an intermediate metal layer in the outer electrodes using the following method (hereinafter "the first analysis"). Randomly selected five multilayer ceramic capacitors embedded in resin were wet-ground to half their width (the W/2 position). The outer electrodes of these five multilayer ceramic capacitors were then observed in backscattered electron images at a magnification of about 1500 obtained using an FE-SEM. Samples in which an intermediate metal layer had been formed (samples having a reacting layer) were determined to contain an intermediate metal layer.

Samples that were discovered in the first analysis to have an intermediate metal layer proceeded to an analysis for the presence of a Cu—Ni—Sn alloy in the intermediate metal layer (hereinafter "the second analysis"). The method of the analysis was as follows. Three points in the intermediate metal layer were analyzed by energy-dispersive X-ray spectroscopy (EDX; an accelerating voltage of about 10 kV) for the proportions of Cu, Ni, and Sn in the metallic composition. Samples in which the intermediate metal layer contained all of Cu, Ni, and Sn at any one of the three points were determined to have an intermediate metal layer containing a Cu—Ni—Sn alloy.

Samples that were discovered in the second analysis to have an intermediate metal layer containing a Cu—Ni—Sn alloy proceeded to an analysis of whether the Cu—Ni—Sn alloy was (Cu, Ni)$_6$Sn$_5$ (hereinafter "the third analysis"). The method of the analysis was as follows. The proportions (atom %) of Cu, Ni, and Sn were calculated with Cu+Ni+Sn defined as 100 atom %. If (Cu+Ni):Sn=6:5, the sample was determined to have an intermediate metal layer containing (Cu, Ni)$_6$Sn$_5$.

The proportion (atom %) of Ni in the intermediate metal layer of a sample that was discovered in the third analysis to have a (Cu, Ni)$_6$Sn$_5$-containing intermediate metal layer was defined as the amount of dissolved Ni in the sample. The average amount of dissolved Ni in five multilayer ceramic capacitors was used.

For these five capacitors, the cross-section of the intermediate metal layer was subjected to elemental mapping for Cu, Ni, and Sn. The cross-section was observed at a magnification of about 1500 in the middle of the end surface of the capacitor, and the pixels in which the amount of dissolved Ni was about 5 atom % or more and about 42 atom % or less were counted. The corresponding thickness values were averaged to give the effective thickness of (Cu, Ni)$_6$Sn$_5$.

Results of Evaluation

Table 1 summarizes the results of the evaluation of Example 1 and Comparative Examples 1 to 3.

TABLE 1

| | | Any Cu—Ni—Sn alloy | Conductive filler(s) | Resin | Amount of conductive filler(s) in dried coating (proportion of conductive filler(s) to resin) | Waterproof reliability | Electrical characteristics |
|---|---|---|---|---|---|---|---|
| Example | 1 | Yes | Cu and Sn | Resole phenolic | Cu + Sn fillers = 60 vol % * Cu:Sn = 58:42 wt % | ⊙ | ⊙ |
| Comparative Example | 1 | No | Ag | Epoxy | Ag filler = 60 vol % | X | X |
| | 2 | No | Cu | Resole phenolic | Cu filler = 60 vol % | X | X |
| | 3 | No | Ag and Sn | Resole phenolic | Ag + Sn fillers = 60 vol % * Ag:Sn = 68:32 wt % | X | ○ |

As presented in Table 1, Example 1 performed well in both tests, rated ⊚ in both waterproof reliability and electrical characteristics. Comparative Examples 1 to 3 performed poorly. Although the electrical characteristics of Comparative Example 3 were given ○, the waterproof reliability and electrical characteristics of Comparative Examples 1 and 2 and the waterproof reliability of Comparative Example 3 were all rated x. These results confirmed that a multilayer ceramic capacitor combines good waterproof reliability and good electrical characteristics when its intermediate metal layer contains a Cu—Ni—Sn alloy.

Table 2 summarizes the results of the evaluation of Examples 1 and 2.

TABLE 2

|  |  | Any Cu—Ni—Sn alloy | $(Cu, Ni)_6Sn_5$ | Conductive fillers | Resin | Amount of conductive fillers in dried coating (proportion of conductive fillers to resin) | Waterproof reliability | Electrical characteristics |
|---|---|---|---|---|---|---|---|---|
| Example | 1 | Yes | Yes | Cu and Sn | Resole phenolic | Cu + Sn fillers = 60 vol % <br> * Cu:Sn = 58:42 wt % | ⊙ | ⊙ |
|  | 2 | Yes | No | Cu and Sn | Resole phenolic | Cu + Sn fillers = 60 vol % <br> * Cu:Sn = 70:30 wt % | Δ | ○ |

As presented in Table 2, Example 1 was rated ⊚ in both waterproof reliability and electrical characteristics. Example was rated Δ in waterproof reliability and ○ in electrical characteristics. Example 1 therefore performed well in both tests as compared with Example 2. These results confirmed that a multilayer ceramic capacitor performs better in both waterproof reliability and electrical characteristics when the Cu—Ni—Sn alloy is $(Cu, Ni)_6Sn_5$.

Table 3 summarizes the results of the evaluation of Examples 3 to 8.

TABLE 3

|  |  | Dissolved Ni in $(Cu, Ni)_6Sn_5$ (atom %) | Maximum heating temperature (° C.) | Duration of heating (min) | Waterproof reliability | Electrical characteristics |
|---|---|---|---|---|---|---|
| Example | 3 | 2 | 375 | 18 | Δ | ○ |
|  | 4 | 5 | 400 | 18 | ○ | ⊙ |
|  | 5 | 10 | 425 | 18 | ⊙ | ⊙ |
|  | 6 | 20 | 450 | 18 | ⊙ | ⊙ |
|  | 7 | 42 | 475 | 18 | ○ | ⊙ |
|  | 8 | 65 | 500 | 18 | Δ | ○ |

As presented in Table 3, Examples 4 to 7 were rated ○ or ⊚ in waterproof reliability, and for electrical characteristics all of these examples were rated ⊚. Examples 3 and 8 were both rated Δ in waterproof reliability and ○ in electrical characteristics. These results confirmed that a multilayer ceramic capacitor performs better in both waterproof reliability and electrical characteristics when the amount of dissolved Ni (atom %) in $(Cu, Ni)_6Sn_5$ is about 5 atom % or more and about 42 atom % or less.

Table 4 summarizes the results of the evaluation of Examples 9 to 14.

TABLE 4

|  |  | Effective thickness of $(Cu, Ni)_6Sn_5$, or the thickness over which the amount of dissolved Ni was about 5 atom % or more and about 42 atom % or less | Dissolved Ni (atom %) | Maximum heating temperature (° C.) | Duration of heating (min) | Waterproof reliability | Electrical characteristics |
|---|---|---|---|---|---|---|---|
| Example | 9 | 0.1 | 11 | 450 | 2 | Δ | ○ |
|  | 10 | 0.3 | 18 | 450 | 5 | ○ | ⊙ |
|  | 11 | 3.2 | 16 | 450 | 10 | ⊙ | ⊙ |
|  | 12 | 8.9 | 26 | 450 | 20 | ⊙ | ⊙ |
|  | 13 | 15.8 | 38 | 450 | 30 | ○ | ⊙ |
|  | 14 | 24 | 37 | 450 | 40 | Δ | ○ |

As presented in Table 4, Examples 10 to 13 were rated ○ or ⊚ in waterproof reliability, and for electrical characteristics all of these examples were rated ⊚. Examples 9 and 14 were both rated Δ in waterproof reliability and ○ in electrical characteristics. These results confirmed that a multilayer ceramic capacitor performs better in both waterproof reliability and electrical characteristics when the thickness of $(Cu, Ni)_6Sn_5$ is about 0.3 μm or more and about 15.8 μm or less.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A multilayer ceramic capacitor comprising:
    a multilayer body including a plurality of ceramic layers and a plurality of inner electrodes; and
    a pair of outer electrodes located on a surface of the multilayer body and electrically connected to the inner electrodes; wherein
    each of the pair of outer electrodes includes:
        an underlying electrode layer on the surface of the multilayer body and including Ni;
        an intermediate metal layer on a surface of the underlying electrode layer and including a Cu—Ni—Sn alloy; and
        a conductive resin layer on a surface of the intermediate metal layer.

2. The multilayer ceramic capacitor according to claim 1, wherein the Cu—Ni—Sn alloy in the intermediate metal layer is $(Cu, Ni)_6Sn_5$.

3. The multilayer ceramic capacitor according to claim 2, wherein the intermediate metal layer contains a Cu—Ni—Sn alloy in which an amount of dissolved Ni is about 5 atom % or more and about 42 atom % or less.

4. The multilayer ceramic capacitor according to claim 3, wherein the intermediate metal layer has a thickness of about 0.3 μm or more and about 15.8 μm or less.

5. The multilayer ceramic capacitor according claim 1, wherein
    the conductive resin layer includes a thermosetting resin and at least one metal; and
    the at least one metal includes Cu, Sn, or an alloy thereof.

6. The multilayer ceramic capacitor according to claim 1, wherein the multilayer body has a substantially cuboid shape.

7. The multilayer ceramic capacitor according claim 1, wherein the multilayer body includes rounded corners and edges.

8. The multilayer ceramic capacitor according to claim 1, wherein the multilayer body includes irregularities on at least one surface thereof.

9. The multilayer ceramic capacitor according to claim 1, wherein a thickness of each of the plurality of ceramic layers is about 0.5 μm or more and about 10 μm or less.

10. The multilayer ceramic capacitor according to claim 1, wherein a thickness of each of the plurality of inner electrodes is about 0.2 μm or more and about 2.0 μm or less.

11. The multilayer ceramic capacitor according to claim 1, wherein a first of the pair of outer electrodes covers a first end surface of the multilayer body, a portion of each of first and second main surfaces of the multilayer body, and a portion of each of first and second side surfaces of the multilayer body, and a second of the pair of outer electrodes covers a second end surface of the multilayer body, a portion of each of the first and second main surfaces, and a portion of each of the first and second side surfaces.

12. The multilayer ceramic capacitor according to claim 1, wherein each of the pair of outer electrodes includes a plating layer on a surface of the conductive resin layer.

13. The multilayer ceramic capacitor according to claim 12, wherein the plating layer has one of a single-layer structure and a multi-layer structure.

14. The multilayer ceramic capacitor according to claim 12, wherein a thickness of the plating layer is equal to about 1 μm or more and about 15 μm or less.

15. The multilayer ceramic capacitor according to claim 12, wherein the plating layer is a Ni plating layer.

16. The multilayer ceramic capacitor according to claim 1, wherein a thickness of a thickest portion of the underlying electrode layer is about 10 μm or more and about 50 μm or less.

17. The multilayer ceramic capacitor according to claim 1, wherein a thickness of the intermediate metal layer is about 0.3 μm or more and about 15.8 μm or less.

18. The multilayer ceramic capacitor according to claim 1, wherein a thickness of the conductive resin layer is about 10 μm or more and about 150 μm or less.

19. The multilayer ceramic capacitor according to claim 1, wherein the conductive resin layer includes conductive particles with a diameter equal to about 0.3 μm or more and about 10 μm or less.

20. The multilayer ceramic capacitor according to claim 19, wherein the particles have a shape that is at least one of spherical and ellipsoidal.

* * * * *